(12) United States Patent
Sathe et al.

(10) Patent No.: US 7,580,035 B2
(45) Date of Patent: Aug. 25, 2009

(54) REAL-TIME COLLISION DETECTION USING CLIPPING

(75) Inventors: Rahul P. Sathe, Hillsboro, OR (US); Oliver Heim, Cameron Park, CA (US)

(73) Assignee: Intel Corporation, Santa Clara, CA (US)

( * ) Notice: Subject to any disclaimer, the term of this patent is extended or adjusted under 35 U.S.C. 154(b) by 413 days.

(21) Appl. No.: 11/648,484

(22) Filed: Dec. 28, 2006

(65) Prior Publication Data

US 2008/0158251 A1 Jul. 3, 2008

(51) Int. Cl.
*G06T 15/00* (2006.01)
(52) U.S. Cl. .................... 345/419; 345/420; 345/421; 345/422; 345/598; 345/620; 703/2; 703/7
(58) Field of Classification Search ............... None
See application file for complete search history.

(56) References Cited

U.S. PATENT DOCUMENTS

| | | | |
|---|---|---|---|
| 6,175,365 B1 * | 1/2001 | Gueziec | 345/419 |
| 6,326,963 B1 | 12/2001 | Meehan | |
| 6,563,503 B1 | 5/2003 | Comair et al. | |
| 6,717,576 B1 * | 4/2004 | Duluk et al. | 345/419 |
| 6,731,304 B2 | 5/2004 | Sowizral et al. | |
| 6,825,851 B1 | 11/2004 | Leather | |
| 6,897,859 B2 * | 5/2005 | Ohta | 345/419 |
| 2002/0030693 A1 * | 3/2002 | Baldwin | 345/620 |
| 2002/0070935 A1 * | 6/2002 | Suzuki | 345/422 |
| 2003/0043147 A1 * | 3/2003 | Heim et al. | 345/421 |
| 2006/0109267 A1 * | 5/2006 | Rybacki et al. | 345/423 |
| 2006/0235659 A1 * | 10/2006 | Stam | 703/2 |

OTHER PUBLICATIONS

PCT Search Report, PCT/US2007/089145, mailed May 1, 2008.

\* cited by examiner

*Primary Examiner*—Kee M Tung
*Assistant Examiner*—Jwalant Amin
(74) *Attorney, Agent, or Firm*—Blakely, Sokoloff, Taylor & Zafman LLP

(57) ABSTRACT

A method is disclosed. The method includes receiving a first polygon, receiving a second polygon, calculating a vector joining a centroid of the first polygon and a centroid of the second polygon, retrieving vertices of each polygon that are farthest from the other polygon in the direction of the vector towards the other polygon, performing a view frustrum from each vertex retrieved for the first polygon to the centroid of the first polygon, performing a clipping operation on the second polygon and determining if the second polygon intersects the view frustrum of one or more of the vertices of the first polygon.

20 Claims, 8 Drawing Sheets

REAL-TIME COLLISION DETECTION USING CLIPPING

FIELD OF THE INVENTION

The present invention relates to computer systems; more particularly, the present invention relates to graphics hardware.

BACKGROUND

Collision detection in three-dimensional (3D) graphics is the process of determining whether two objects, typically rigid bodies comprising linked polygons such as triangles, are in contact with each other. Usually this is done by having a processor implement an algorithm to calculate whether a triangle of one object conflicts spatially with a triangle of another object. Although there are a variety of approaches to this problem all standard solutions use the processor to execute calculations including testing for object-to-object collisions using a spatial data structure such as an octree and then undertaking a series of geometric calculations to assess polygon-to-polygon collisions for those objects whose bounding volumes are shown to be intersection candidates.

When implemented in a processor such as a central processing unit (CPU) these traditional approaches to collision detection can occupy significant computing resources that, particularly in a 3D gaming context, may be better spent in undertaking CPU-specific tasks such as physics calculations or implementing artificial intelligence routines. Moreover, by implementing collision detection in the CPU rather than a dedicated graphics processor such as a graphical processing unit (GPU) the traditional approaches fail to take advantage of the hardware primitives supported by modern graphics texture sampling hardware.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

A mechanism for collision detection is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
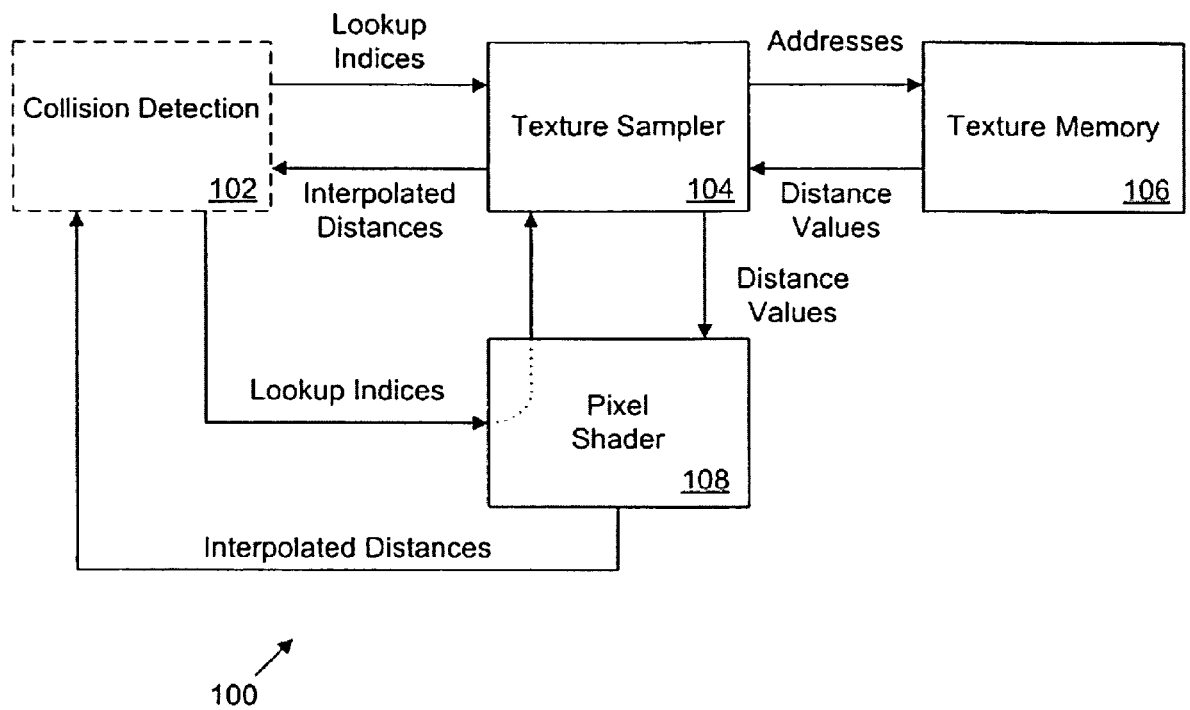
FIG. 1 illustrates one embodiment of a 3D rendering engine.

FIG. 1 is a block illustrating one embodiment of a 3D rendering engine 100. Engine 100 includes a collision detection mechanism 102, a texture sampler 104, and texture memory 106. In other embodiments, 3D rendering engine may include other components (e.g., tessellation unit, vertex shader, etc.). However, such components have been excluded from FIG. 1 so as not to obscure implementations of the invention.

Engine 100 also includes a pixel shader 108 that may be used to couple mechanism 102 to texture sampler 104. Moreover, while FIG. 1 illustrates one texture sampler 104 those skilled in the art will recognize that more than one texture sampler may be implemented and/or coupled to collision detection mechanism 102 and/or memory 106 without departing from the scope and spirit of the claimed invention.

In one embodiment, collision detection mechanism 102 includes a detection routine including any combination of software, and/or firmware that may be used to detect collisions between objects. Thus, mechanism 102 may provide texture sampler 104 with one or more lookup indices. Alternatively, mechanism 102 may provide shader 108 with one or more lookup indices and shader 108 may convey those indices to texture sampler 104.

Sampler 104 may then use those indices to access distance data stored at corresponding texture addresses of a texture map held or stored in texture memory 106 as will be explained in greater detail below. Those skilled in the art will recognize that mechanism 102 may include a collision detection kernel spawned by a 3D graphics application (not shown) executing on a computing system that supports engine 100. Alternatively, mechanism 102 may include a collision detection kernel spawned by pixel shader 108. Those skilled in the art will further recognize that the terms objects, geometries, polygons, bodies and polyhedrons may be used interchangeably.

Texture sampler 104 may be any texture sampling logic including any combination of hardware, software, and/or firmware that is capable of accessing texture data in memory 106 in response to one or more lookup indices provided by mechanism 102. In one embodiment, the texture data stored in memory 106 and accessed by sampler 104 may include a texture map, such as a cube map, comprising an array of pixels (or "texels") storing distance values as will be explained in greater detail below.

Sampler 104 may then use the indices provided by mechanism 102 to determine associated texture addresses to be used to access the corresponding distance values stored and/or held in memory 106. Sampler 104 may then use those distance values to generate interpolated distance values and may provide those interpolated distance values to mechanism 102 as will be described in greater detail below. Alternatively, sampler 104 may provide those distance values to shader 108 and shader 108 may generate interpolated distance values and provide those interpolated distance values to mechanism 102.

Texture memory 106 may include any memory device or mechanism suitable for storing and/or holding one or more texture maps, such as one or more cube maps, specifying texel data such as distance values. While memory 106 may include any volatile or non-volatile memory technology such as Random Access Memory (RAM) memory or Flash memory, the invention is in no way limited by the type of memory employed for use as memory 106.

Figure 2:
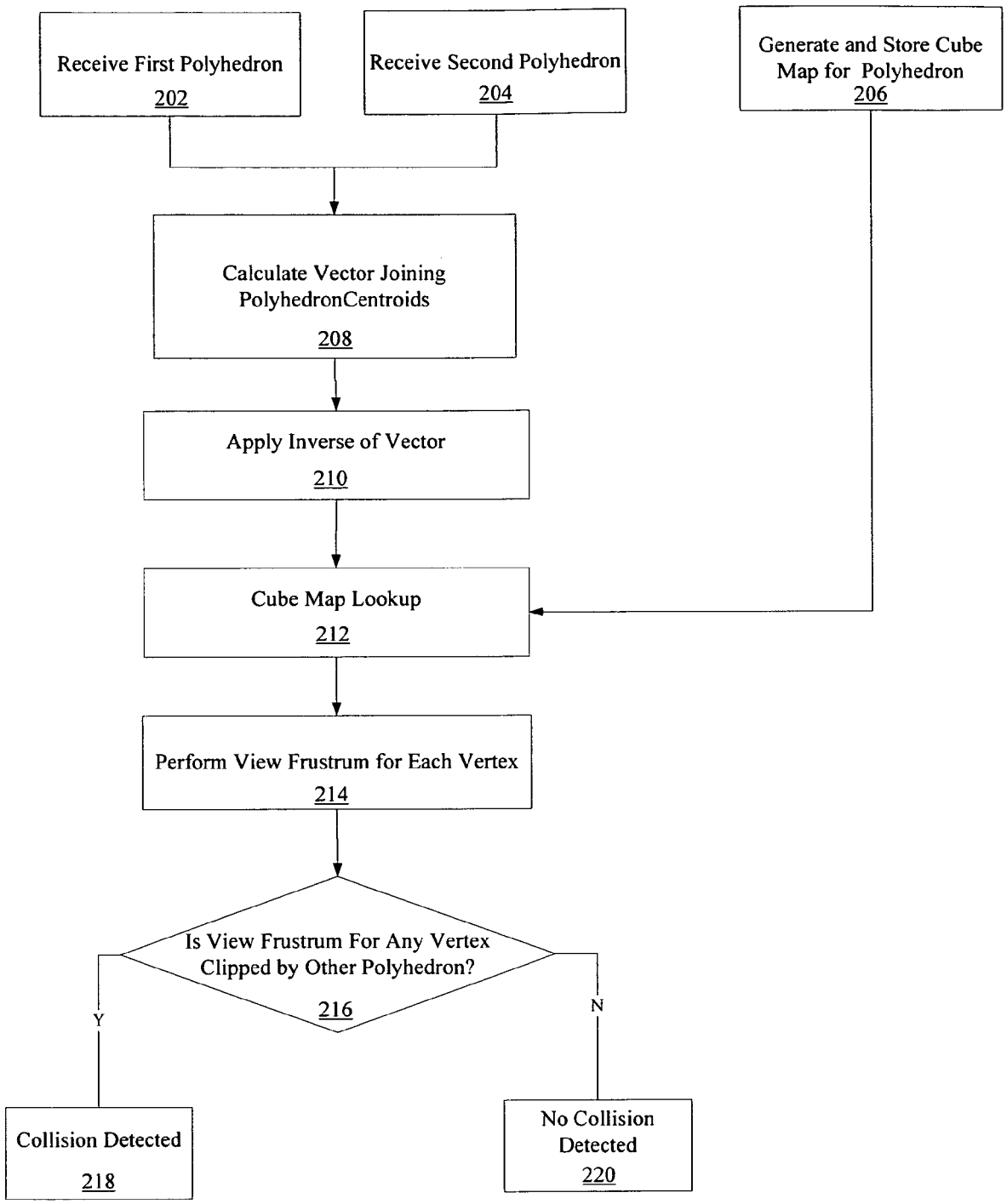
FIG. 2 is a flow chart illustrating one embodiment of collision detection.

FIG. 2 is a flow chart illustrating one embodiment of implementing collision detection at engine 100. At processing blocks 202 and 204, first and second polyhedrons are received, respectively, at collision detection mechanism 102. In one embodiment, the polyhedrons are convex polyhedrons. A convex polyhedrons may be defined as an object wherein any whole straight line segment joining any two points of the object is contained wholly within the object In a further embodiment, processing blocks 202 and 204 may, for example, involve collision detection mechanism 102 receiving vertex coordinates of first and second triangles where those coordinates are defined, for example, with respect to a model coordinate system that may be implemented by a 3D graphics application (now shown). Such a 3D graphics application may spawn mechanism 102 and may supply mechanism 102 with geometric primitives, such as triangles.

In further embodiments, mechanism 102 may have, prior to processing blocks 202 and 204, already subjected 3D graphical objects to a trivial reject phase using a spatial data structure such as an octree or a kd-tree. In doing so, mechanism 102 may have determined that two objects, one including the first polyhedron of processing block 202 and another including the second polyhedron of processing block 204, have passed this reject phase and thus are candidates for further collision detection testing. Details about the various methods of undertaking the trivial reject phase of a collision detection process are beyond the scope of the claimed invention and are well known in the art.

At processing block 206, a cube map is generated for the first and second polyhedrons, and distance values are stored for each. In one embodiment, processing block 206 is implemented in application software in a preprocessing phase occurring prior to any other steps in the process. In other embodiments, processing block 206 may be undertaken by application software in run time concurrent with other components of the process.

Figure 3:
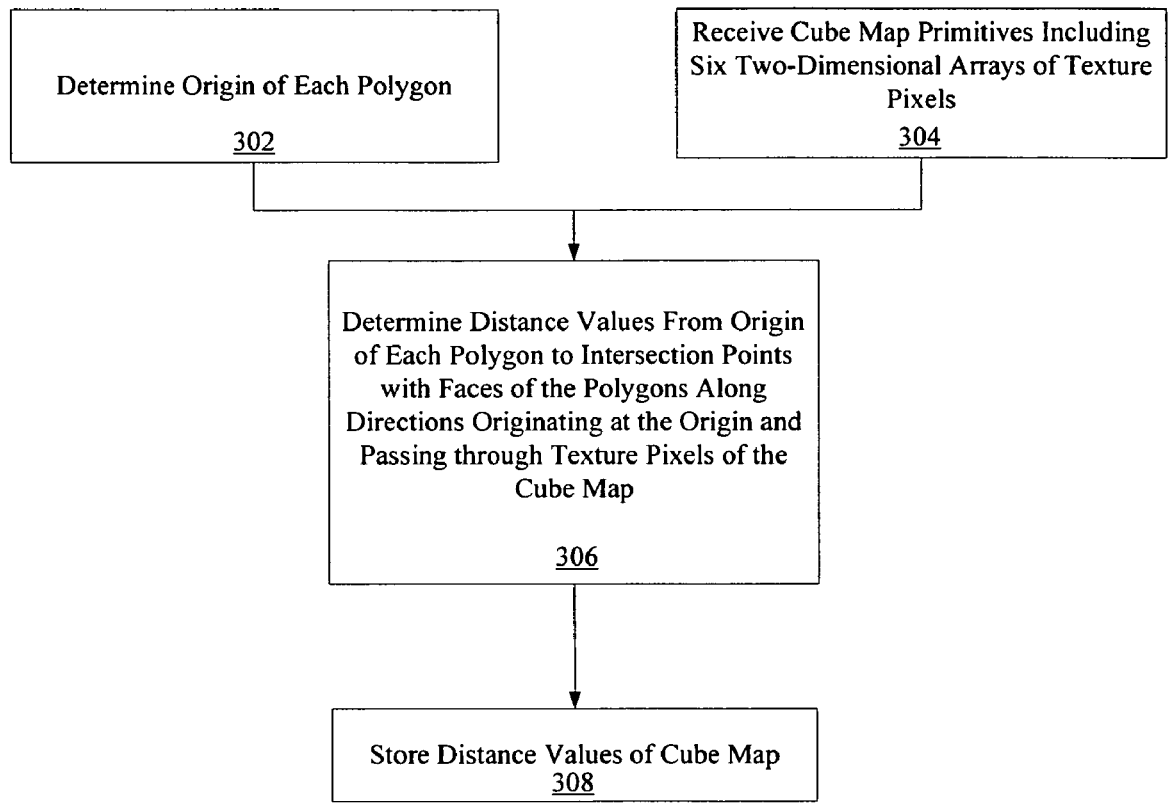
FIG. 3 is a flow chart illustrating one embodiment of generating a farthest feature map.
Figure 4:
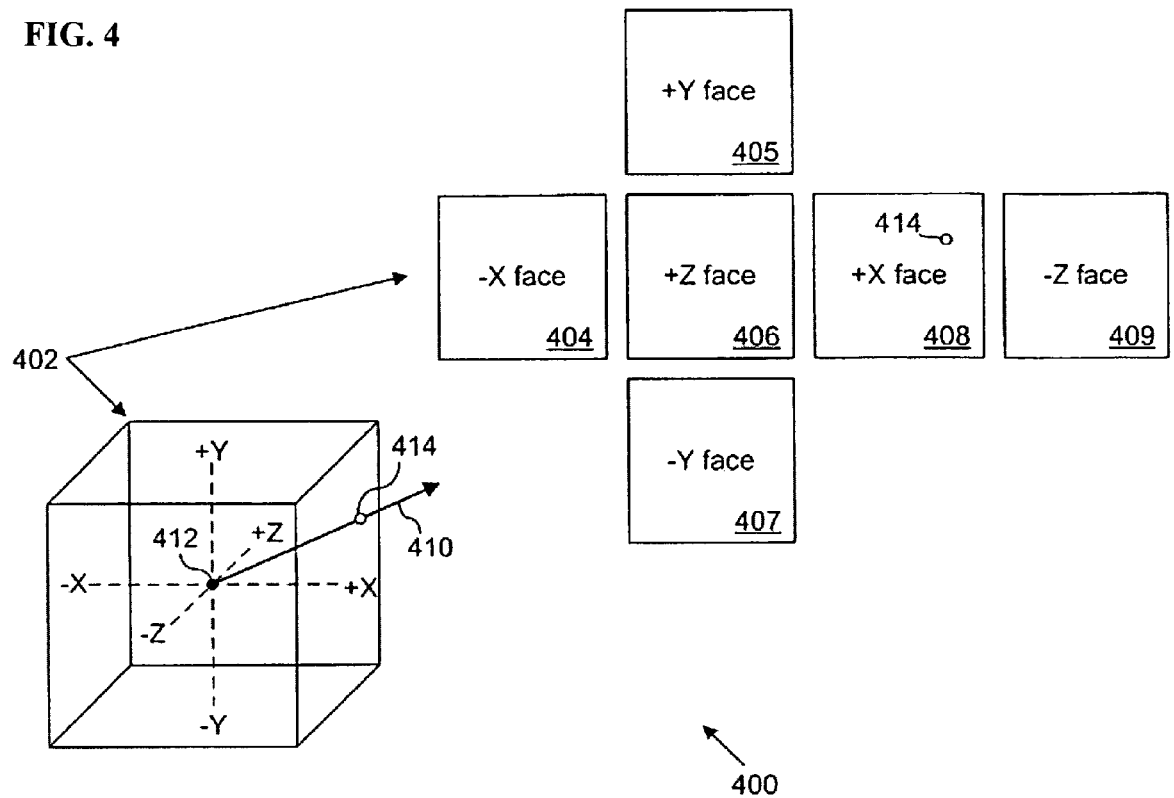
FIGS. 4-8 illustrate embodiments of schemes useful for discussing the processes of FIGS. 2 and 3.

FIG. 3 is a flow chart illustrating one embodiment of generating a cube map and storing distance values in accordance with processing block 206 discussed above. FIG. 4 illustrates one embodiment of a cube map labeling scheme 400. Scheme 400 shows a 3D cube map primitive 402 that may correspond to standard cube map primitives as defined by 3D graphics applications such as, for example, DirectX.

Map 402 may be include six two-dimensional (2D) texture maps 404-409 arranged as the faces of a cube wherein each one of maps 404-409 may include an eight-by-eight array of pixels. According to one embodiment, each of 2D maps 404-409 of 3D cube map 402 may be treated as a lookup table of values that may be accessed by using indexes specifying particular pixels of maps 404-409.

Coordinates for each pixel of 2D maps 404-409 may be indexed by a 3D direction vector 410 originating at an origin 412 of cube map 402. In some embodiments, origin 412 may correspond to the centroid of an object such as a polygon as will be explained in further detail below. According to one embodiment, a set of unique direction vectors are defined such that each vector of the set of vectors passes through a corresponding pixel of one of 2D maps 404-409. For example, vector 410 passes through a pixel 414 of map 408, where map 408 corresponds to a +X face of cube map 402 and where pixel 414 may correspond to a specific (u,v) texture coordinate pair of map 402. Thus, vector 410 may be defined by origin 412 and the texture coordinate pair corresponding to pixel 414.

In one embodiment, origin 412 is the centroid of an object or the circumcenter of an object. However, in other embodiments, origin 412 may include any point lying inside an object. Moreover, while the texture primitive employed in processes 200 and 300 may include a cube map primitive the invention is not limited in this regard and, thus, for example, processes 200 and 300 may be undertaken using other 3D texture primitives such as texture primitives employing more than six 2D faces or, for example, paraboloid or spherical texture primitives.

Referring back to FIG. 3, a determination of an origin of the first and second polygons is made at processing block 302, where the polygons are the same polygons as those received at processing blocks 202 and 204 in FIG. 2. Those skilled in the art will recognize the technique of determining a bounding sphere of a polygon as one way to determine an origin of a polygon in accordance with processing block 302. However in other embodiments, any arbitrary means could be used to determine the origin of a 3D object.

Figure 5:
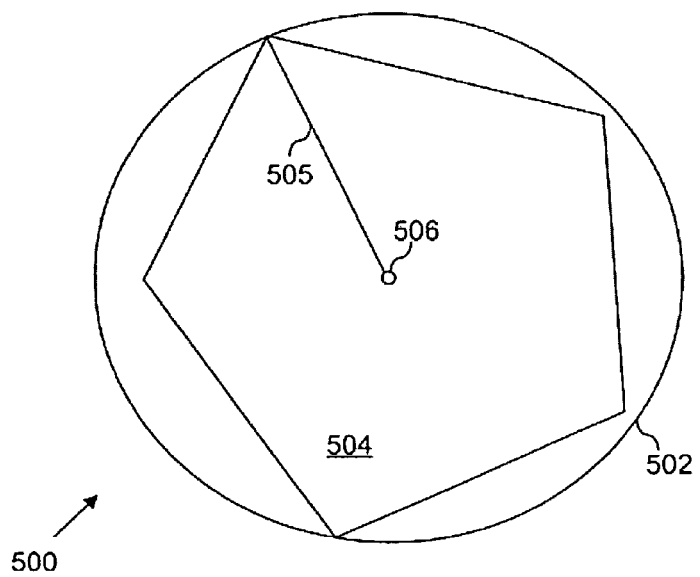

For the sake of discussion, FIG. 5 illustrates a scheme 500 for determining a bounding sphere in accordance with some implementations of processing block 302. While, for the purposes of illustration, FIG. 5 illustrates bounding sphere 502 and an associated polygon 504 in 2D, implementations of processing block 302 may be undertaken on a 3D polygon resulting in a 3D bounding sphere.

Bounding sphere 502 represents a hypothetical sphere that encompasses polygon 504 such that the scalar radius 505 of sphere 502 defines a maximum distance from the center 506 of the sphere to any point of polygon 504. When so defined, the center 506 of sphere 502 represents the centroid of polygon 504. Thus as a result of processing block 302, an origin such as a centroid of the first polygon may be determined.

Referring back to FIG. 3, a cube map primitive is received at processing block 304, where the primitive includes six 2D arrays of texture pixels. At processing block 306, determination of distance values are made from the origin of the first polygon to intersection points with faces of the first polygon along directions originating at the origin and passing through pixels of the cube map.

Figure 6:
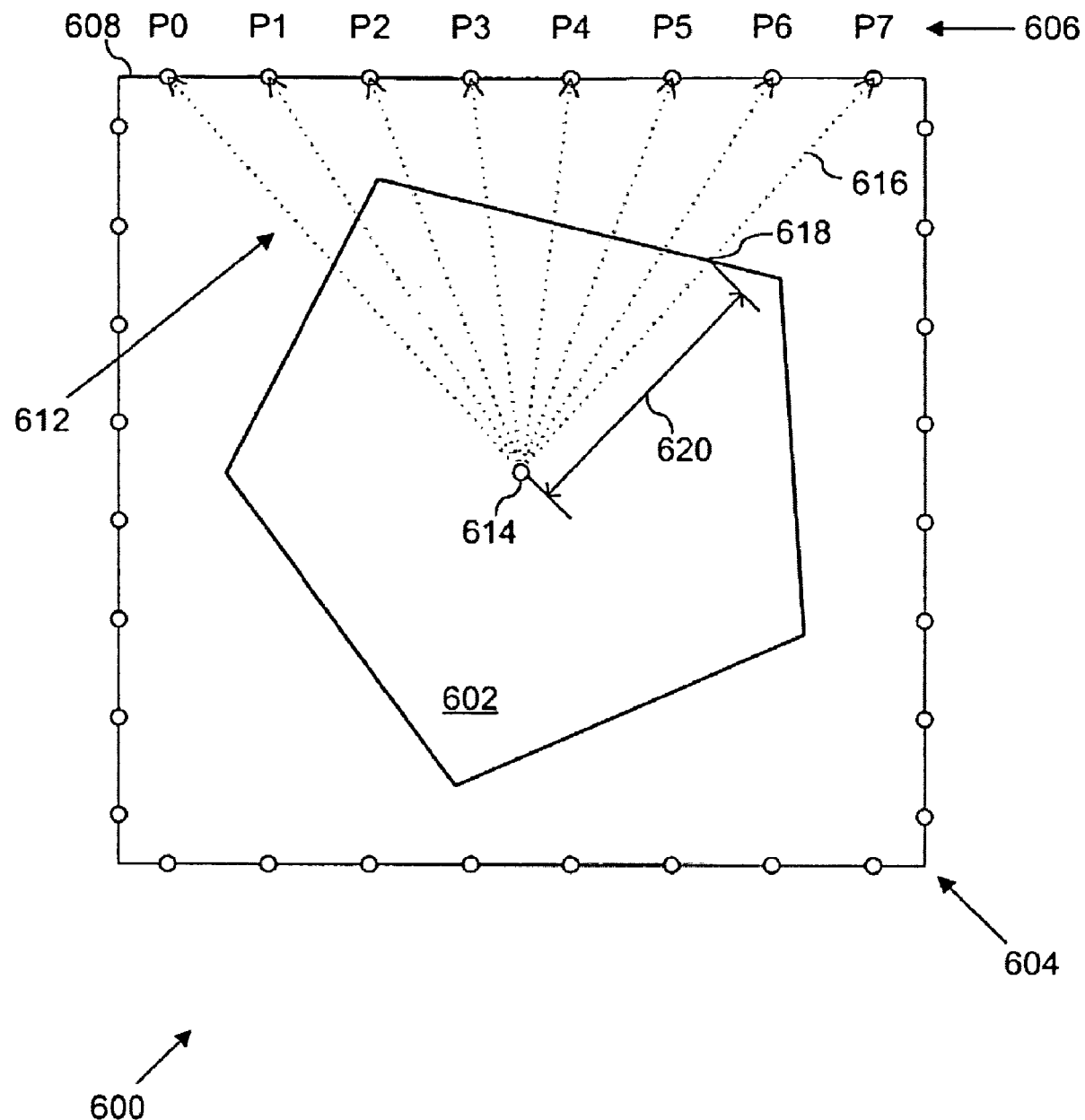

FIG. 6 illustrates a scheme 600 for determining distance values in accordance with some implementations of processing block 306. FIG. 6 shows a 2D cross-section of a polygon 602 and a cube map 604. While, for the purposes of illustration, FIG. 6 illustrates a 2D cross-section of polygon 602 and map 604. Implementations of processing block 306 may be undertaken on a 3D polygon resulting in a determination of distance values with respect to a 3D cube map.

FIG. 6 shows one row 606 of pixels P1-P7 of one face 608 of map 604 where, in accordance with some implementations of processing block 306, distance values may be determined along eight unique directions 612 where each of directions 612 begins at an origin 614 of polygon 602 and passes through a separate one of pixels 606. Thus, for example, a direction 616 passing through pixel P7 has an intersection 618 with a face of polygon 602 and a distance value 620 defined as the distance between origin 614 and the location of pixel P7. In a similar manner, distance values in accordance with processing block 306 may be determined for all directions 612 in FIG. 6 as well as for all other directions (not shown) for the remaining pixels of cube map 604.

While FIG. 6 shows a cross-section of a cube map 604 where each face of map 604 may include an eight-by-eight array of pixels so that cube map 604 may include a total of 8×8×6 pixels, the invention is not limited to a particular resolution. Thus, for example, processing block 306 may be undertaken with different resolution cube maps for each polygon processed. For example, the cube map received in processing block 302 may include six 2D sixteen-by-sixteen pixel arrays so that the cube map employed may include a total of 1,536 pixels.

Alternatively, the cube map received in processing block 302 may include six 2D four-by-four pixel arrays so that the cube map may include a total of 96 pixels. Moreover, those skilled in the art will recognize that processing block 306 may be undertaken by determining distance values along only a subset of directions (e.g., only a subset of directions 612) with the remaining distance values determined by linear interpolation between pairs of the distance values determined in processing block 306.

Referring back to FIG. 3, distance values for the cube map are stored, processing block 308. In one embodiment, the values stored for each polygon include the number of points of the object farthest in a particular direction, the array of vertices corresponding to the farthest points, the number of triangles that include the vertices and an array of triangle faces that include these vertices.

In some embodiments, an application (e.g., 3D graphics application) may undertake all acts performed in FIG. 3 in a preprocessing stage and supply the resulting texture map to mechanism 102 in processing block 206. Alternatively, in other embodiments, mechanism 102 may undertake the performed acts in a dynamic manner while evaluating each collision detection event occurring during 3D rendering implemented by engine 100.

Further, for each polygon received in processing blocks 202 and 204, an associated cube map storing distance values for that polygon may have been generated in processing block 206. In accordance with further embodiments, acts performed in FIG. 3 may result in a cube map being held or stored in memory 106.

Referring back to FIG. 2, a direction vector joining the two centroids of polygon 1 and polygon 2 is calculated, processing block 208. At processing block 210, the inverse of the world transformation matrix is applied to the vector. This inverse is applied to find the corresponding direction in the polygon's model space. This is the direction that will be used as a look-up into the cube-maps. At processing block 212, a cube map lookup is performed for each polygon to find the stored points that lie farthest from the centroid in the given direction (e.g., the vector direction).

These retrieved points are used for the following calculations. Since the points farthest from the centroid of one polygon in the direction of the other polygon are the same points that are closest to the other polygon, these are the only points that need to be tested to determine if there has been a collision. Thus, if there is no collision at these points there cannot be a collision at other points of a polygon.

Figure 7:
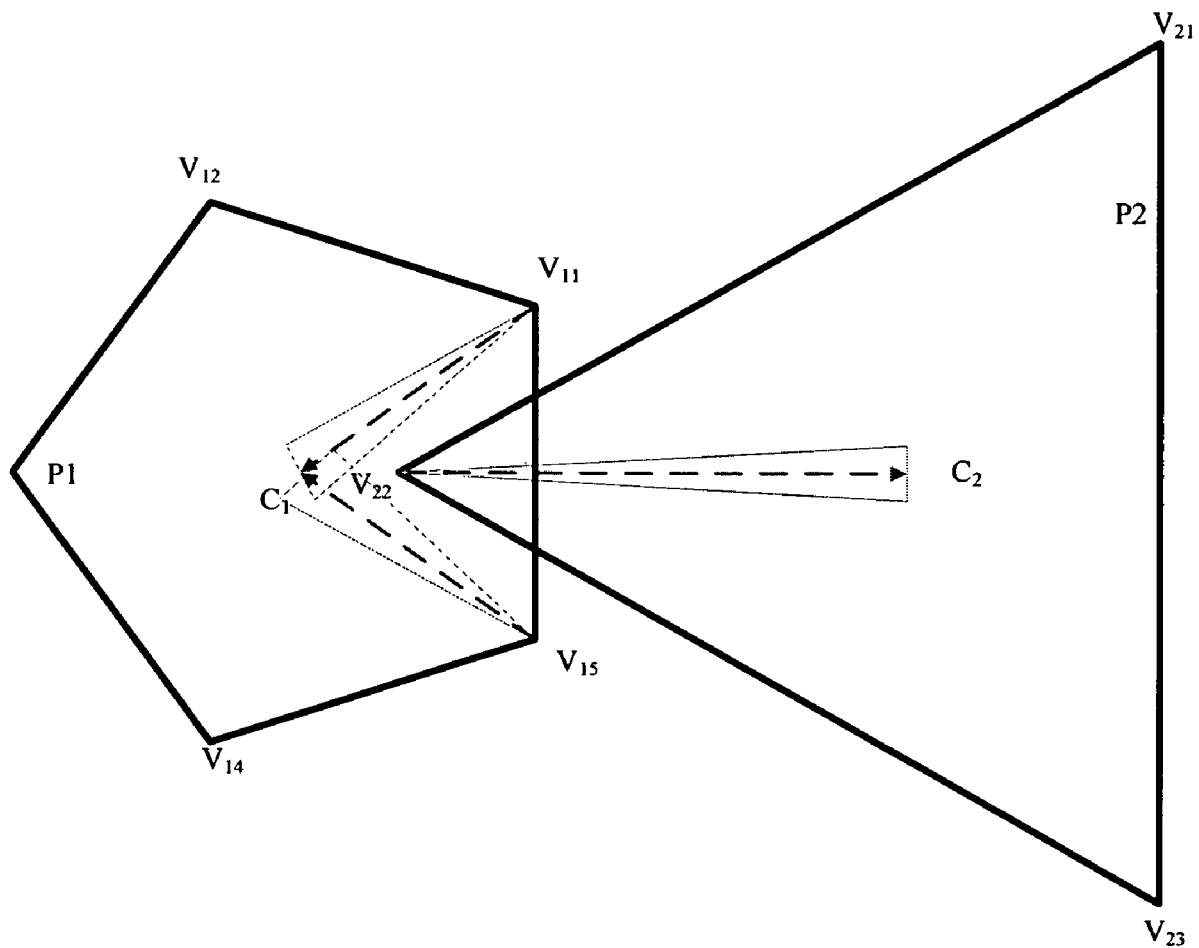

FIG. 7 illustrates one embodiment of polygons P1 and P2, used to illustrate the process performed in FIG. 2. Based on a vector drawn between C1 and C2, the farthest points from C1 in P1 towards C2 are vertices $V_{11}$ and $V_{15}$, while the farthest point from C2 in P2 towards C1 is vertex $V_{22}$. Referring back to FIG. 2, a view frustum is created starting from each of the farthest points on polyhedron 1 in the direction of the centroid for polyhedron 1, processing block 214.

A view frustrum defines a field of vision from the point on the polygon to the centroid. Thus for vertices $V_{11}$ and $V_{15}$ in FIG. 7, the view frustrums are shown as the triangles emanating from the respective vertices to C1. Referring back to FIG. 2, a clipping scheme is subsequently performed to determine if polygon 2 intersects this view frustrum. In one embodiment, the clipping scheme clips edges of polygon 2 that forms a fan around the farthest vertices (e.g., vertices $V_{11}$ and $V_{15}$). Thus, the clipping operation results in edges $V_{22}$-$V_{21}$ and $V_{22}$-$V_{23}$ being rendered for $V_{22}$. At decision block 216, it is determined whether the view frustrums from vertices $V_{11}$ and $V_{15}$ are intersected by the rendered edges of polygon 2 (e.g., does P2 collide with P1). In the case of 3D, theses edges will correspond to triangles that form fans around the farthest vertices.

If an edge of P2 intersects the view frustums of P1, a collision is detected, processing block 218. If none of the rendered edges intersect, no collision has occurred, processing block 220. As shown in FIG. 7, no edges of P2 intersect the view frustums of P1. Processing blocks 214-220 are subsequently repeated for polygon 2. For processing block 214 for P2, the view frustrum is shown from vertex $V_{22}$ to centroid C2. The clipping operation for P2 results in edges $V_{12}$-$V_{11}$ and $V_{11}$-$V_{15}$ being rendered for $V_{11}$, and edges $V_{11}$-$V_{15}$ and $V_{15}$-$V_{14}$ being rendered for $V_{15}$. As shown, the edge $V_{11}$-$V_{15}$ intersects the view frustrum of $V_{22}$, resulting in a collision being detected.

Figure 8:
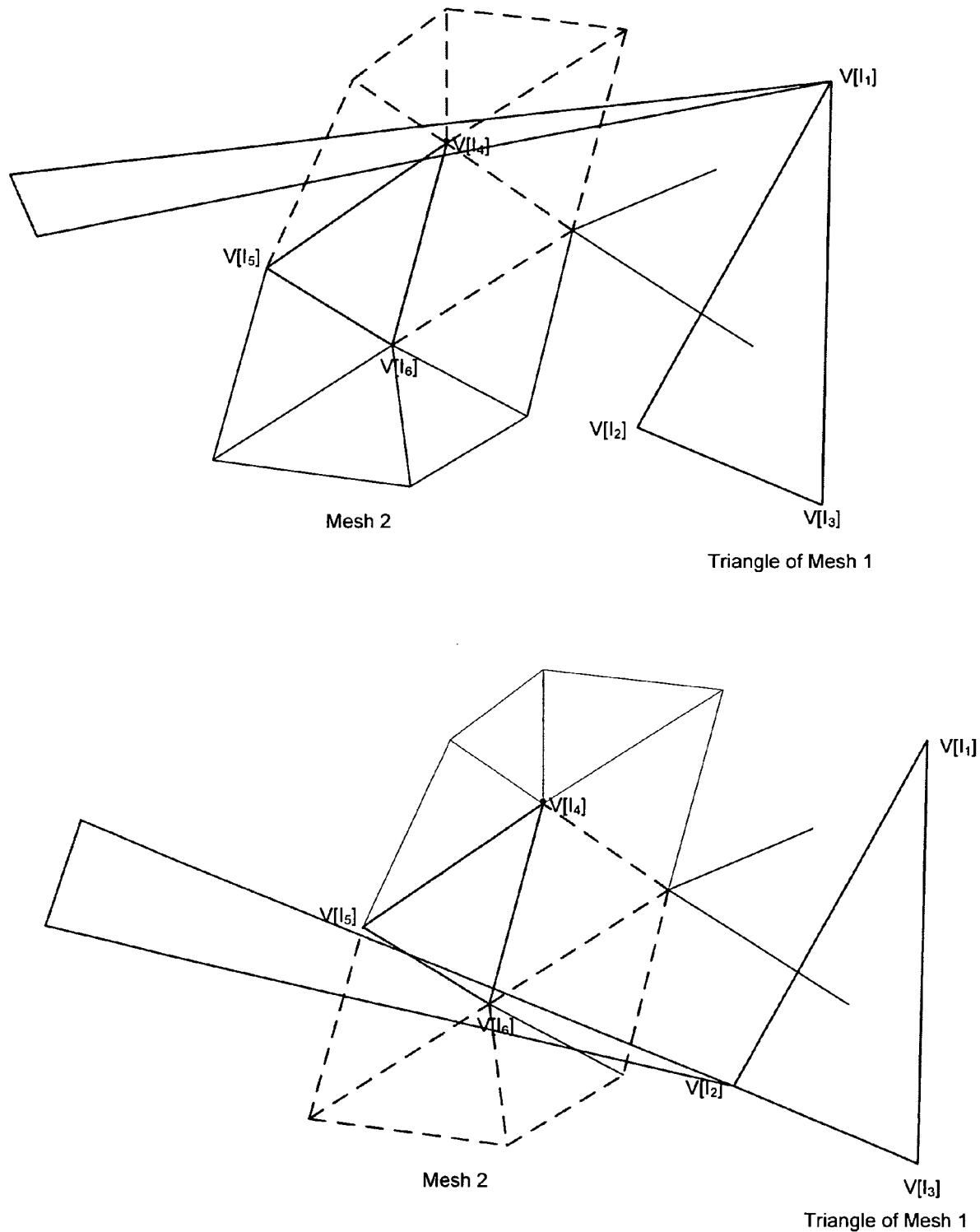

FIG. 8 illustrates a 3D version of two intersecting objects for which the processes of FIG. 2 may be performed. FIG. 8 shows two triangles. Triangle $V[I_1], V[I_2], V[I_3]$ belongs to object 1, and triangle $V[I_4], V[I_5], V[I_6]$ belong to object 2. $I_1$, $I_2$, $I_3$ are the indices of vertices in a mesh 1 that are farthest from centroid 1 in the direction of centroid 2. Likewise $I_4, I_5, I_6$ are the vertices in Mesh 2 that are farthest from centroid 2 in the direction of centroid 1. The dotted lines show the fan that is formed around these vertices for two of these vertices, namely $V[I_4]$ and $V[I_6]$.

According to one embodiment, mechanism 102 as implemented in the processes described in FIG. 2 may include the following pseudo-code:

```
bool collision_detect( ) {
    C1C2 = vector joining two centroids;
    // // Find the vertices of the two objects
    // that are closest to each other using cube-map look-ups.
    (I1,I2,I3) = object-1-cube-map(C1C2);
    (I4,I5,I6) = object-2-cube-map(C2C1);
    foreach index (I1,I2,I3) {
        vertex = Object1Vertices[index];
        SetViewFrustrum(EyePt = vertex, LookAt =
        vector(vertex,centroid2),
                NearPlane =0; FarPlane = dist(vertex,centroid2) )
        if (ClipDetermination(viewFrustum, object2->fan(I4,I5,I6))) {
            return collision;
        }
    }
    Foreach index (I4,I5,I6) {
        vertex = Object2Vertices[index];
        SetViewFrustrum(EyePt = vertex, LookAt =
        vector(vertex,centroid1),
                NearPlane =0; FarPlane = dist(vertex,centroid1) )
        if (ClipDetermination(viewFrustum, object1->fan(I1,I2,I3))) {
            return collision;
        }
    }
}
```

The processing blocks shown in FIGS. 2 and 3 need not be implemented in the order shown; nor do all of the acts necessarily need to be performed. Also, those acts that are not dependent on other acts may be performed in parallel with the other acts. For example, processing blocks 202 and 204 may be undertaken in parallel. Alternatively, processing blocks 202 and 204 may be combined into a single action. In other words, the receipt of first and second polygons may take place in a single action. Further, at least some of the acts in this figure may be implemented as instructions, or groups of instructions, implemented in a machine-readable medium.

Figure 9:
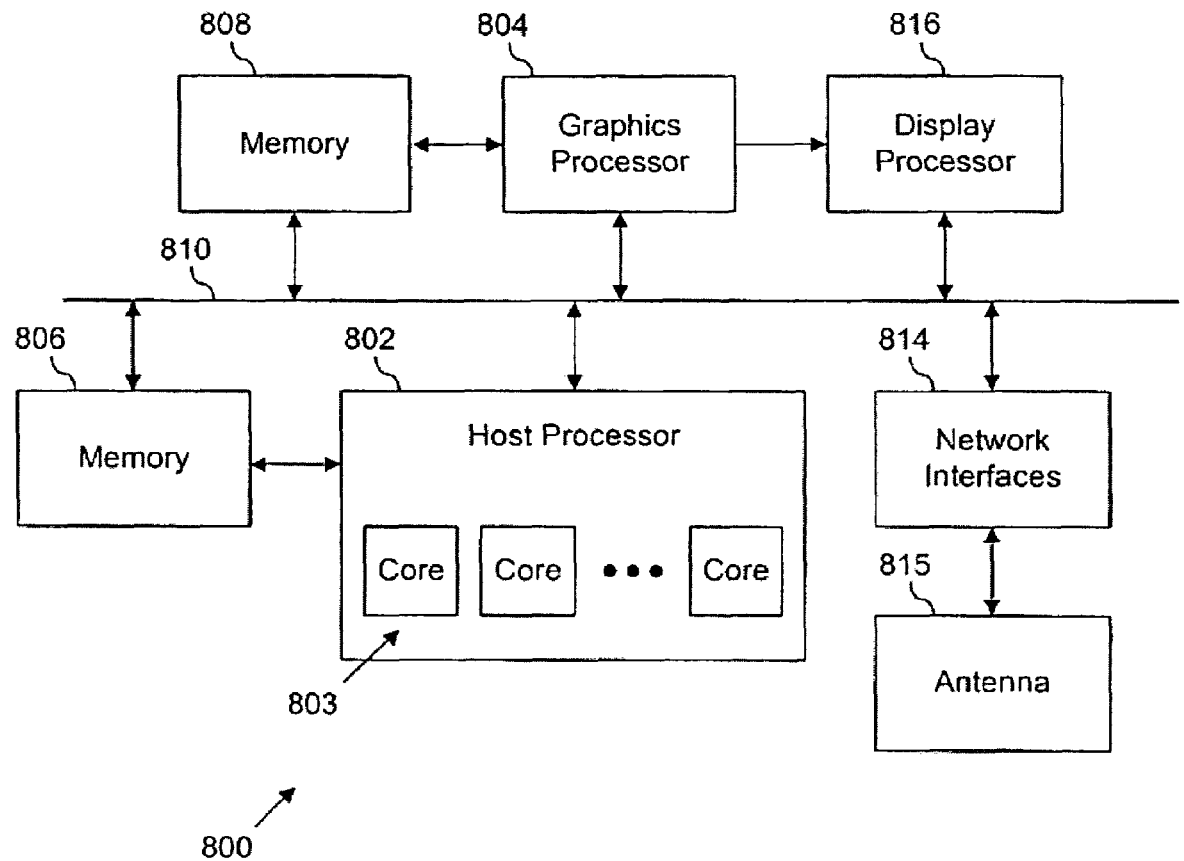
FIG. 9 illustrates a system in accordance with some implementations of the invention.

FIG. 9 illustrates an example system 800 in accordance with some implementations of the invention. System 800 may include a host processor 802 having two or more processing cores 803, a graphics processor 804, memories 806 and 808 (e.g., dynamic random access memory (DRAM), static random access memory (SRAM), non-volatile memory, etc.), a bus or communications pathway(s) 810, network interfaces 814 (e.g., wired and/or wireless local area network (LAN) and/or wide area network (WAN) and/or personal area network (PAN), and/or other wired and/or wireless network interfaces), and a display processor and/or controller 816.

System 800 may also include an antenna 815 (e.g., dipole antenna, narrowband Meander Line Antenna (MLA), wideband MLA, inverted "F" antenna, planar inverted "F" antenna, Goubau antenna, Patch antenna, etc.) coupled to network interfaces 814. System 800 may be any system suitable for processing 3D graphics data and providing that data in a rasterized format suitable for presentation on a display device (not shown) such as a liquid crystal display (LCD), or a cathode ray tube (CRT) display to name a few examples.

System 800 may assume a variety of physical implementations. For example, system 800 may be implemented in a personal computer (PC), a networked PC, a server computing system, a handheld computing platform (e.g., a personal digital assistant (PDA)), a gaming system (e.g., consoles (portable or otherwise)), a 3D capable cellular telephone handset, etc.

Moreover, while all components of system 800 may be implemented within a single device, such as a system-on-a-chip (SOC) integrated circuit (IC), components of system 800 may also be distributed across multiple ICs or devices. For example, host processor 802 along with components 806 and 814 may be implemented as multiple ICs contained within a single PC while graphics processor 804 and components 808 and 816 may be implemented in a separate device such as a television or other display coupled to host processor 802 and components 806 and 814 through communications pathway 810.

Host processor 802 may include a special purpose or a general purpose processor including any control and/or processing logic, hardware, software and/or firmware, capable of providing graphics processor 504 with 3D graphics data and/or instructions. Processor 802 may perform a variety of 3D graphics calculations such as 3D coordinate transformations, etc. the results of which may be provided to graphics processor 804 over bus 810 and/or that may be stored in memories 806 and/or 808 for eventual use by processor 804. In some implementations of the invention host processor 802 may be a Central Processing Unit (CPU).

In one embodiment, host processor 802 may be capable of performing any of a number of tasks that support or enable real-time, multi-resolution 3D collision detection using cube maps. Support tasks may include, for example, although the invention is not limited in this regard, providing 3D graphics data to graphics processor 804, placing one or more texture maps, such as cube maps, in memory 808, downloading microcode (via antenna 815 and interfaces 814) to processor 804, initializing and/or configuring registers within processor 804, interrupt servicing, and providing a bus interface for uploading and/or downloading 3D graphics data. In other embodiments, additional processing units, such as PPU (physics processing unit) or SPU (Special processing unit) may be implemented.

In alternate embodiments, some or all of these functions may be performed by graphics processor 804. While FIG. 9 shows host processor 802 and graphics processor 804 as distinct components, the invention is not limited in this regard and those of skill in the art will recognize that processors 802 and 804 possibly in addition to other components of system 800 may be implemented within a single IC.

In accordance with some implementations of the invention, each of cores 803 may perform, in parallel, processes 200/300 for separate pairs of polygons using separate implementations of collision detection mechanism 102. Alternatively, such parallel processing schemes may be implemented by graphics processor 804.

Graphics processor 804 may include any processing logic, hardware, software, and/or firmware, capable of processing graphics data. In one implementation, graphics processor 804 may implement a 3D graphics architecture capable of processing graphics data in accordance with one or more standardized rendering application programming interfaces (APIs) such as OpenGL 2.0™ ("The OpenGL Graphics System: A Specification" (Version 2.0; Oct. 22, 2004)) and DirectX 9.0™ (Version 9.0c; Aug. 8, 2004) to name a few examples, although the invention is not limited in this regard. Graphics processor 804 may process 3D graphics data provided by host processor 802, held or stored in memories 806 and/or 808, and/or provided by sources external to system 800 and obtained over bus 810 from interfaces 814.

Graphics processor 804 may receive 3D graphics data in the form of 3D scene data and process that data to provide image data in a format suitable for conversion by display processor 816 into display-specific data. In addition, graphics processor 804 may implement a variety of 3D graphics processing components and/or stages (not shown) such as a rasterizer stage in addition to one or more texture samplers similar to texture sampler 104.

Texture samplers implemented by graphics processor 804 may fetch or access texture data stored or held in the form of cube maps in either or both of memories 806 and 808. Further, in accordance with some implementations of the invention, graphics processor 804 may implement two or more texture samplers capable of using distance values stored in one or more cube maps to undertake collision detection for multiple pairs of polygons in a parallel fashion.

Bus or communications pathway(s) 810 may include any mechanism for conveying information (e.g., graphics data, instructions, etc.) between or amongst any of the elements of system 800. For example, although the invention is not limited in this regard, communications pathway(s) 810 may include a multipurpose bus capable of conveying, for example, instructions (e.g., macrocode) between processor 802 and processor 804. Alternatively, pathway(s) 810 may include a wireless communications pathway.

Display processor 816 may include any processing logic, hardware, software, and/or firmware, capable of converting rasterized image data supplied by graphics processor 804 into a format suitable for driving a display (i.e., display-specific data). For example, while the invention is not limited in this regard, processor 804 may provide image data to processor 816 in a specific color data format, for example in a compressed red-green-blue (RGB) format, and processor 816 may process such RGB data by generating, for example, corresponding LCD drive data levels etc.

Although FIG. 9 shows processors 804 and 816 as distinct components, the invention is not limited in this regard, and those of skill in the art will recognize that, for example, some if not all of the functions of display processor 816 may be performed by graphics processor 804 and/or host processor 802.

Thus, by taking advantage of hardware primitives such as cube maps a collision detection mechanism in accordance with the invention may execute entirely on a graphics processor such as processor 804 with, possibly, the exception of the preprocessing of process 300 which may be implemented once for each polygon and done ahead of process 200.

Further, a collision detection mechanism in accordance with the invention can leverage a high level octree structure to minimize object-object detections and may rely on cube maps for those object-object interactions that are identified as candidates by the octree data structure. Thus, by moving the collision detection algorithm to a graphics processor (e.g., processor 804) the CPU (e.g., host processor 802) may be freed up to undertake other tasks.

Although a collision detection algorithm in accordance with the invention may execute on a CPU as well. Moreover, using hardware primitives such as cube maps to detect collisions may result in a significant reduction of the arithmetic operations per collision (possibly as much as a three-fold reduction) and is amenable to a many processing core implementation (e.g., using cores 803) due to the capability of performing completely independent collision detection tests. In other embodiments, cube-map look-up can be done entirely in software on one of the cores, in FIG. 9 without any additional hardware and/or texture addressing modes.

While the foregoing description of one or more instantiations consistent with the claimed invention provides illustration and description of the invention it is not intended to be exhaustive or to limit the scope of the invention to the particular implementations disclosed. Clearly, modifications and variations are possible in light of the above teachings or may be acquired from practice of various implementations of the invention. For example, while FIG. 1 and the accompanying text may show and describe a single texture sampler 104 coupled to a single texture memory 106, those skilled in the art will recognize that data processors in accordance with the invention may include rendering engines that employ multiple texture samplers, each operating in accordance with the invention, coupled to one or more texture memories. Clearly, many other implementations may be employed to provide for real-time, multi-resolution 3D collision detection using cube maps and clipping in accordance with the invention.

No device, element, act, data type, instruction etc. set forth in the description of the present application should be construed as critical or essential to the invention unless explicitly described as such. Also, as used herein, the article "a" is intended to include one or more items. Moreover, when terms or phrases such as "coupled" or "responsive" or "in communication with" are used herein or in the claims that follow, these terms are meant to be interpreted broadly. For example, the phrase "coupled to" may refer to being communicatively, electrically and/or operatively coupled as appropriate for the context in which the phrase is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed is:

1. A method comprising:
   receiving a first polygon;
   receiving a second polygon;
   calculating a vector joining a centroid of the first polygon and a centroid of the second polygon;
   retrieving vertices of each polygon that are farthest from the other polygon in the direction of the vector towards the other polygon;
   performing a view frustrum from each vertex retrieved for the first polygon to the centroid of the first polygon;
   performing a clipping operation on triangles that form fans around the farthest vertices of the second polygon; and
   determining if the second polygon intersects the view frustrum of one or more of the vertices of the first polygon.

2. The method of claim 1 wherein a determination that the intersection by the second polygon of the view frustrum of the one or more of the vertices of the first polygon indicates a collision between the first polygon and the second polygon.

3. The method of claim 1 further comprising:
   performing a view frustrum from each vertex retrieved for the second polygon to the centroid of the second polygon if it is determined that the second polygon does not intersect the view frustrum of one or more of the vertices of the first polygon;
   performing a clipping operation on the first polygon; and
   determining if the first polygon intersects the view frustrum of one or more of the vertices of the second polygon.

4. The method of claim 1 wherein the clipping operation clips faces of the second polygon that form around the one or more of vertices retrieved for the first polygon.

5. The method of claim 1 further comprising applying an inverse of the vector after calculating the vector.

6. The method of claim 1 further comprising generating a first texture map for the first polygon and a second texture map for the second polygon.

7. The method of claim 6, wherein generating the first and second texture maps comprises determining a centroid of the polygon.

8. A graphics processor comprising a collision detection mechanism to detect a collision between a first polygon and a second polygon by calculating a vector joining a centroid of the first polygon and a centroid of the second polygon, retrieving vertices of each polygon that are farthest from the other polygon in the direction of the vector towards the other polygon, performing a view frustrum from each vertex retrieved for the first polygon to the centroid of the first polygon, and determining if the second polygon intersects the view frustrum of one or more of the vertices of the first polygon.

9. The graphics processor of claim 8 wherein the collision detection mechanism further performs a clipping operation on the second polygon.

10. The graphics processor of claim 9 wherein the clipping operation clips edges of the second polygon that form around the one or more of vertices retrieved for the first polygon.

11. The graphics processor of claim 8 wherein the collision detection mechanism further performs a view frustrum from each vertex retrieved for the second polygon to the centroid of the second polygon if it is determined that the second polygon does not intersect the view frustrum of the one or more of the vertices of the first polygon and determines if the first polygon intersects the view frustrum of one or more of the vertices of the second polygon.

12. The graphics processor of claim 8 further comprising texture sampling logic to receive one or more lookup indices from the collision detection mechanism specifying pixels of a texture map.

13. An article comprising a machine-accessible medium having stored thereon instructions that, when executed by a machine, cause the machine to:
   receive a first polygon;
   receive a second polygon;
   calculate a vector joining a centroid of the first polygon and a centroid of the second polygon;
   retrieve vertices of each polygon that are farthest from the other polygon in the direction of the vector towards the other polygon;

perform a view frustrum from each vertex retrieved for the first polygon to the centroid of the first polygon;

perform a clipping operation on the second polygon; and determine if the second polygon intersects the view frustrum of one or more of the vertices of the first polygon.

14. The article of claim 13 wherein the instructions, when executed by a machine, further cause the machine to:

perform a view frustrum from each vertex retrieved for the second polygon to the centroid of the second polygon if it is determined that the second polygon does not intersect the view frustrum of one or more of the vertices of the first polygon;

perform a clipping operation on the first polygon; and determine if the first polygon intersects the view frustrum of one or more of the vertices of the second polygon.

15. The article of claim 13 wherein the instructions, when executed by a machine, further cause the machine to generate a first texture map for the first polygon and a second texture map for the second polygon.

16. The article of claim 13, wherein generating the first and second texture maps comprises determining a centroid of the polygon.

17. A system comprising:

memory to store a texture map; and a collision detection mechanism to detect a collision between a first polygon and a second polygon by calculating a vector joining a centroid of the first polygon and a centroid of the second polygon, retrieving vertices of each polygon that are farthest from the other polygon in the direction of the vector towards the other polygon, performing a view frustrum from each vertex retrieved for the first polygon to the centroid of the first polygon, and determining if the second polygon intersects the view frustrum of one or more of the vertices of the first polygon.

18. The system of claim 17 further comprising texture sampling logic to receive one or more lookup indices from the collision detection mechanism specifying pixels of a texture map.

19. The system of claim 17 wherein the collision detection mechanism further performs a clipping operation on the second polygon.

20. The system of claim 17 wherein the collision detection mechanism further performs a view frustrum from each vertex retrieved for the second polygon to the centroid of the second polygon if it is determined that the second polygon does not intersect the view frustrum of the one or more of the vertices of the first polygon and determines if the first polygon intersects the view frustrum of one or more of the vertices of the second polygon.

* * * * *